United States Patent
Aupperle et al.

(10) Patent No.: US 8,495,594 B2
(45) Date of Patent: Jul. 23, 2013

(54) METHOD AND SYSTEM FOR PROVIDING A COMPONENTIZED RESOURCE ADAPTER ARCHITECTURE

(75) Inventors: Bryan Eric Aupperle, Cary, NC (US); John Henry Green, Toronto (CA); Vernon Maurice Green, Newbury (GB); Ernest Wing Mah, Markham (CA); Amy Thatcher Mollin, Montara, CA (US); Piotr Przybylski, Brooklin (CA); Elizabeth Catherine Savoie, Raleith, NC (US); Paul Stanley, Delray Beach, FL (US); Philip Ivor Wakelin, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1345 days.

(21) Appl. No.: 11/971,908

(22) Filed: Jan. 10, 2008

(65) Prior Publication Data

US 2009/0183144 A1   Jul. 16, 2009

(51) Int. Cl.
*G06F 9/45* (2006.01)

(52) U.S. Cl.
USPC ............................. 717/137; 717/139; 707/811

(58) Field of Classification Search
USPC ................. 717/136–161; 707/802, 809–811
See application file for complete search history.

(56) References Cited

U.S. PATENT DOCUMENTS

| | | | |
|---|---|---|---|
| 6,615,166 B1 * | 9/2003 | Guheen et al. | 703/27 |
| 6,976,061 B1 | 12/2005 | Sharma | 709/220 |
| 7,036,110 B2 | 4/2006 | Jeyaraman | 717/120 |
| 7,599,947 B1 * | 10/2009 | Tolbert et al. | 1/1 |
| 2003/0037173 A1 * | 2/2003 | Pace et al. | 709/310 |
| 2004/0177360 A1 | 9/2004 | Beisiegel et al. | 719/316 |
| 2004/0192277 A1 | 9/2004 | Pakarinen et al. | 455/518 |
| 2005/0065800 A1 * | 3/2005 | Green et al. | 705/1 |
| 2005/0091655 A1 | 4/2005 | Probert et al. | 719/315 |
| 2005/0149941 A1 | 7/2005 | Watson et al. | 719/310 |
| 2005/0210052 A1 * | 9/2005 | Aldridge | 707/101 |
| 2005/0256892 A1 * | 11/2005 | Harken | 707/101 |
| 2005/0278452 A1 | 12/2005 | Tankov et al. | 709/230 |

(Continued)

OTHER PUBLICATIONS

Shu et al., EXPRESS: a data Extraction, Processing, and Restructuring System, vol. 2 Issue 2, Jun. 1977, pp. 134-174.*

(Continued)

*Primary Examiner* — Wei Zhen
*Assistant Examiner* — Satish Rampuria
(74) *Attorney, Agent, or Firm* — Janaki K. Davda; Konrad, Raynes, Davda & Victor LLP

(57) ABSTRACT

A computer program product comprises a computer useable medium. The computer useable medium has a computer readable program such that when the computer readable medium is executed on a computer, the computer is caused to configure an adapter such that the adapter is specific to a data source, provides a communication link to the data source, converts a format of the data source to a format native to a middleware system, and converts a format of metadata of the data source to a standard metadata format. Further, the computer is caused to configure an application interface component to convert an invocation of a function in the middleware system to an invocation of a function provided by an Enterprise Information System through the adapter, convert the data format of the middleware system to a format native to the Enterprise Information System accessed through the adapter, and maintain metadata describing a message format and a function provided by the adapter.

25 Claims, 6 Drawing Sheets

U.S. PATENT DOCUMENTS

| | | | | |
|---|---|---|---|---|
| 2006/0080435 | A1 | 4/2006 | Tankov et al. | 709/225 |
| 2006/0212870 | A1 | 9/2006 | Arndt et al. | 718/104 |
| 2006/0235928 | A1 | 10/2006 | Cacenco et al. | 709/205 |
| 2006/0271528 | A1* | 11/2006 | Gorelik | 707/3 |
| 2007/0113234 | A1 | 5/2007 | Chinnappa et al. | 718/104 |
| 2009/0019458 | A1* | 1/2009 | Katari et al. | 719/328 |
| 2009/0187926 | A1 | 7/2009 | Green et al. | |

OTHER PUBLICATIONS

David E. Bakken, MIDDLEWARE, aquired from http://eecs.wsu.edu/~bakken/middleware.pdf on Mar. 1, 2012, pp. 1-5.*

Maheshwari, Piyush; Kim, Ji-Ho; "Analyzing Reusability Aspects in Java Connector Architecture"; IEEE Computer Society, Proccedings of the 11th Asia-Pacific Software Engineering Conference (APSEC'04).

Sharma, Rahul et al. *J2EE™ Connector Architecture and Enterprise Application Integration*: Chapter 10: "Building A Resource Adapter", pp. 181-202, Dec. 14, 2991, http://safari.informit.com/0201775808.

Kartik, Bagi Sri et al.; "Seamless Network Management inPresence of Heterogeneous Management Protocols for Next Generation Networks"; IEEE Computer Society, 9th International Conference on Information Technology; 2006.

* cited by examiner

METHOD AND SYSTEM FOR PROVIDING A COMPONENTIZED RESOURCE ADAPTER ARCHITECTURE

BACKGROUND

1. Field

This disclosure generally relates to software integration. More particularly, the disclosure relates to connectivity to Enterprise systems.

2. General Background

A variety of middleware products are currently utilized to support business software applications. Examples of such middleware products include transaction processing systems, message processing systems, and Extract, Transform, Load ("ETL") systems. The various middleware systems have different performance profiles and requirements. Some middleware systems deal with relatively small amounts of data, but need to process requests very quickly. Other middleware systems deal with very large amounts of data and need to access this data in pieces of manageable size.

As a result, a business software environment may include a large number of runtimes, which are engine, servers, or software applications performing a function that need to access data from external resources. In many cases, adapters have been developed for these products to access an external Enterprise Information System ("EIS") such as a database, transaction processing system, etc. As a result, a multitude of adapters have been built using various technologies to provide access to the same resources. This overlap provides tremendous expense, e.g., development costs and maintenance costs, for the software developer. Further, end users are exposed to inconsistencies in the tools and capabilities of the connectivity solutions provided by different products.

Current approaches do not allow for standard connectivity to Enterprise systems from different runtime environments because the current standards are defined for specific environments, e.g., Java™ Platform, Enterprise Edition ("Java™ EE"). Accordingly, these current approaches do not permit the reuse of adapters between different runtime environments, e.g., Application Server, Information Management, or System Management.

Attempts have been made to share adapters between products. However, these attempts have failed for a multitude of reasons. One reason is that the interfaces are often incompatible with one another. Further, additional infrastructure that is foreign to the software environment often needs to be utilized. In addition, data and/or format conversions, which can be costly with respect to central processing unit ("CPU") performance, may need to be utilized.

SUMMARY

In one aspect of the disclosure, a computer program product comprises a computer useable medium. The computer useable medium has a computer readable program such that when the computer readable medium is executed on a computer, the computer is caused to configure an adapter such that the adapter is specific to a data source, provides a communication link to the data source, converts a format of the data source to a format native to a middleware system, and converts a format of metadata of the data source to a standard metadata format. Further, the computer is caused to configure an application interface component to convert an invocation of a function in the middleware system to an invocation of a function provided by an EIS through the adapter, convert the data format of the middleware system to a format native to the EIS accessed through the adapter, and maintain metadata describing a message format and a function provided by the adapter.

In another aspect of the disclosure, a process is provided. The process configures an adapter such that the adapter is specific to a data source, provides a communication link to the data source, converts a format of the data source to a format native to a middleware system, and converts a format of metadata of the data source to a standard metadata format. Further, the process configures an application interface component to convert an invocation of a function in the middleware system to an invocation of a function provided by an EIS through the adapter, convert the data format of the middleware system to a format native to the EIS accessed through the adapter, and maintain metadata describing a message format and a function provided by the adapter.

In yet another aspect of the disclosure, a system is provided. The system includes an adapter. The adapter is specific to a data source, provides a communication link to the data source, converts a format of the data source to a format native to a middleware system, and converts a format of metadata of the data source to a standard metadata format. Further, the system includes an application interface component that converts an invocation of a function in the middleware system to an invocation of a function provided by an EIS through the adapter, converts the data format of the middleware system to a format native to the EIS accessed through the adapter, and maintains metadata describing a message format and a function provided by the adapter.

DRAWINGS

The above-mentioned features of the present disclosure will become more apparent with reference to the following description taken in conjunction with the accompanying drawings wherein like reference numerals denote like elements and in which:

FIG. 1 illustrates an architecture component model for the componentized resource adapter architecture.

FIG. 2 provides an example of the architecture component model providing support for Java™ adapters.

DETAILED DESCRIPTION

Figure 1:
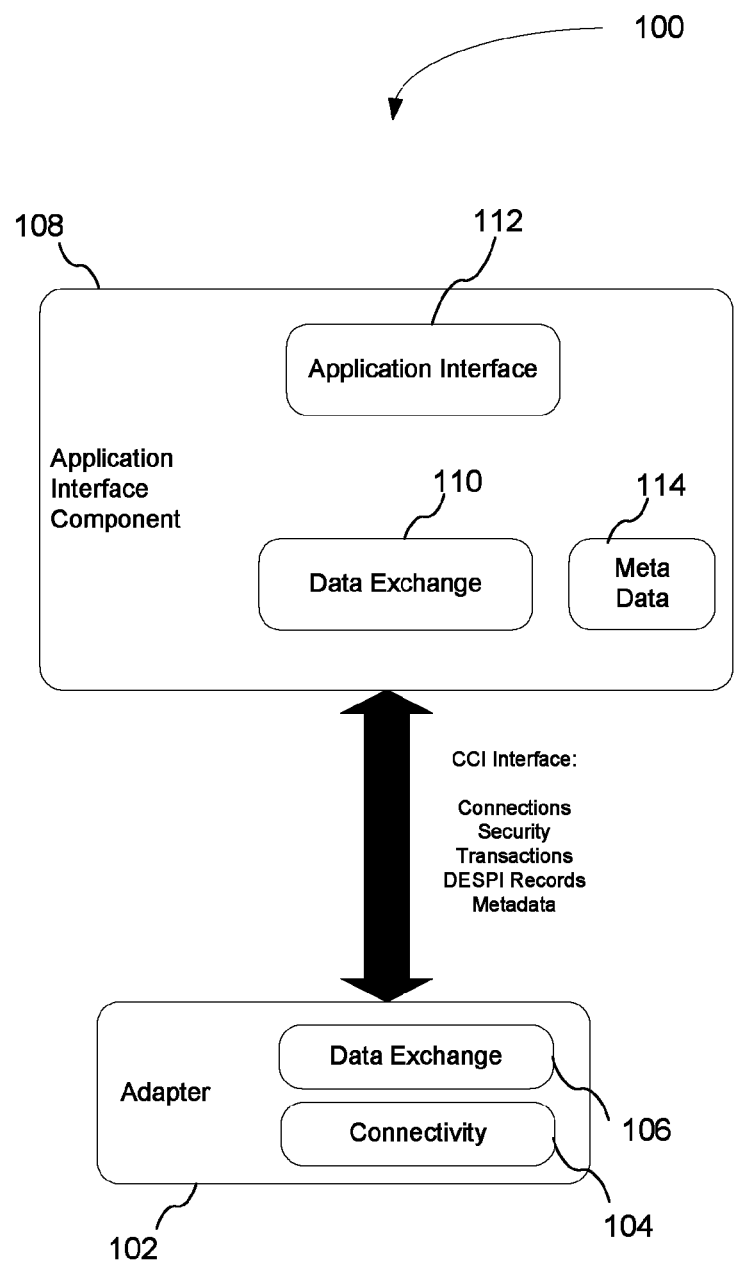

A componentized resource adapter architecture can be utilized to consolidate the multiple approaches and migrate towards a single adapter for each resource. The single adapter can then be shared by all products that need access to that resource. In other words, a componentized resource adapter can be configured for use by multiple runtimes. Architectural differences in software environments are eliminated as the componentized resource adapter architecture enables interface components to be tailored specifically for each product that wishes to consume the adapters. Accordingly, efficient and reusable connectivity components can be built. As an example, the componentized resource adapter architecture can be based on the J2EE™ Connector Architecture 1.5

("JCA") along with extensions to resolve ambiguities in the specification and to address the requirements for metadata, efficient data handling, and problem determination.

The componentized resource adapter architecture can be utilized to build a common set of adapters to various data sources despite the differences in how middleware systems represent data. Accordingly, while an adapter is specific to a data source, the adapter is independent of the middleware systems and the data representation of the middleware systems. At the same time, in one embodiment, the middleware systems interface to various adapters through a single well-defined interface.

Accordingly, the componentized resource adapter architecture provides a single approach for adapter development and evolution. Further, the componentized resource adapter architecture may implement recognized standards provide incentives for partners and third parties to develop connectors based on these standards. For example, the componentized resource adapter architecture can support the Java™ and J2EE™ environments, but allows other runtimes to exploit the adapters also. The componentized resource adapter architecture also enables efficient, high-performance, runtime-independent data-handling for the exchange of large amounts of data. Further, the componentized resource adapter architecture allows the development of adapter components with pluggable subcomponents that fit a common framework.

The adapter tooling in the componentized resource adapter architecture can connect to EISs and discover the data definitions and services they support. Further, services can be built for EIS systems that support metadata discovery as well as resources that do not support metadata discovery, e.g., a file system.

The componentized resource adapter architecture has a plurality of runtime standards. The first runtime standard applies to the data exchange interfaces. Three core runtime components are utilized to provide a flexible adapter framework with clear component boundaries. These core runtime components are the application interface, connector, and common services components. In particular, the data exchange interface between the connector and application interface components is data-independent. These runtime components support data formats that are independent of the runtime data format, a metadata format shared between adapters and runtimes, both inbound and outbound interactions, complex data structures and multiple data formats (e.g., Records, Rows, Documents, Streams), request/response and cursor interactions, and Performance Optimization (e.g., large data volume support—partitioning and streaming, and minimized need for conversion, copying and canonicalization)

Further, the second runtime standard is inbound and outbound processing support. Whenever allowed by an EIS, the adapter supports multi-directional requests such that it is possible to initiate interactions from either side of the integrated EIS solution.

Finally, the third runtime standard is topology. This standard helps ensure that adapters can operate within a variety of topologies to accommodate different integration scenarios. The adapters should meet systems management requirements for recovery when a sub-system in a deployed integrated solution fails. Further, the adapters should support remote deployment that is independent from the integration server as opposed to the more normal local deployment. The adapters should also support local adapter deployment as components inside a lightweight integration server.

Performance and scalability can also be measured. The adapters should provide sufficient throughput to meet the high-performance demands of ETL scenarios, scale to support peak user loads without degrading performance objectives, provide end-to-end performance that is comparable to JCA adapter providers, and provide end-to-end performance that is comparable to non-JCA adapter providers.

FIG. 1 illustrates an architecture component model 100 for the componentized resource adapter architecture. The architecture component model 100 utilizes a layered approach to allow a plurality of components to interact through a set of well-defined interfaces. Further, the componentized approach utilized in the architecture component model 100 allows for the separate and independent development of each component as well as the reuse of each component.

An adapter component 102 encapsulates basic connectivity to the EIS and the exchange of the data with the EIS. The adapter component 102 can be driven by the metadata describing interactions with the EIS. In one embodiment, the adapter component 102 includes separate subcomponents for connecting to the EIS and for exchanging data. The first subcomponent is a connectivity subcomponent 104, and the second subcomponent is a data exchange subcomponent 106.

The connectivity subcomponent 104 includes functionality for establishing, maintaining, and closing connections to the target EIS. Further, the connectivity subcomponent 104 provides support for transactions and security for these connections. The connectivity subcomponent 104 interacts with the specific libraries and functionality of the target EIS. The connectivity subcomponent 104 is exposed to the application interface component through standard JCA common client interfaces ("CCI") including Connection, ConnectionFactory, Interaction and InteractionSpec for outbound, and ResourceAdapter and ActivationSpec for the inbound.

The data exchange subcomponent 106 includes functionality for passing or receiving data from the application component through the data exchange interface. This interface is format neutral and runtime neutral. Accordingly, the interface permits any kind of structured or streamed data to be moved between these components. The adapter 102 understands the data format of the EIS and is able to convert it to invocations of Data Exchange interface.

The connector component is developed by the connector provider, who has knowledge of the target EIS, its interfaces, and its behavior. The connector provider can be the EIS vendor, a dedicated connector vendor, or an in-house developer providing access to the required EIS.

The Application Interface Component 108 is a bridge between the runtime environment, e.g., a Middleware Application, and the adapter 102. The Application Interface Component 108 enables invocation of the adapter from the clients by using the appropriate programming model. Further, the Application Interface Component 108 is responsible for mapping the specific invocation to the invocation of the adapter 102 through the JCA CCI. The component developer who has knowledge of the connector invocation interfaces and the runtime programming model delivers the Application Interface Component 108. The Application Interface Component 108 consists of a data exchange subcomponent 110, an application interface subcomponent 112, and metadata 114.

The data exchange subcomponent 110 is an implementation of data exchange interfaces in the Application Interface Component 108. Accordingly, the data exchange subcomponent 110 converts the invocations of the data exchange interfaces to runtime-specific data representations. Further, the application interface 112 is the interface that matches the runtime programming model and maps runtime-specific invocations to the invocation of the adapter 102 through CCI. In addition, the metadata 114 describes the structure of the data exchange with the EIS through the Data Exchange Service Provider Interface ("DESPI"), which is a set of interfaces to exchange data with the adapter 102. The metadata can also provide information to the adapter 102 about how the data can be exchanged with the EIS.

A metadata format common between the adapter 102 and the application interface component 108 is supported to allow the structure of the data exchanged through the DESPI interface to be defined. For example, the externalized metadata definition format may be based on Service Data Objects ("SDO") specification version 2.1 and represented by the SDO Type.

In one embodiment, the metadata produced by the adapter 102 is in the form of annotated Extensible Markup Language ("XML") schemas. The annotations contain application-specific information which the adapter 102 utilizes at runtime to associate objects or individual properties with the equivalent in the external resource. This application-specific information, or "appinfo", can be used to identify key fields, mappings to external types, or for any other purpose that the adapter dictates. The appinfo should be treated as an opaque string by all components other than the adapter 102. At runtime, definitions convey the metadata to the adapter 102. These definitions are typically constructed from the imported XML schemas. Some environments may prefer to programmatically construct the metadata from their own metadata representation, which would have been created from the original XML schemas. Any appinfo annotations in the schemas should be preserved by such environments and then provided along with the type definition for consumption by the adapter 102.

The architecture component model 100 allows a plurality of input sources available through adapters to interact with multiple runtimes, by reducing the number of distinct interfaces from M×N to 1×N and/or M×1. Further, the data exchange set of interfaces eliminates the need for an intermediate object as seen, for example, in SDO, when an intermediate SDO object needs to be built and converted to a native object if SDO is utilized to move data between an adapter and a middleware system that does not operate natively with SDO objects. In addition, the lack of a defined format for the data to be exchanged between an adapter and its client, as seen with JCA, is alleviated by the data exchange set of interfaces. Accordingly, middleware systems can much more easily adopt JCA by utilizing the data exchange set of interfaces.

The architecture component model 100 intended to support as many runtime and design environments as possible. The adapters developed from the architecture component model 100 are accessible by all runtimes.

Figure 2:
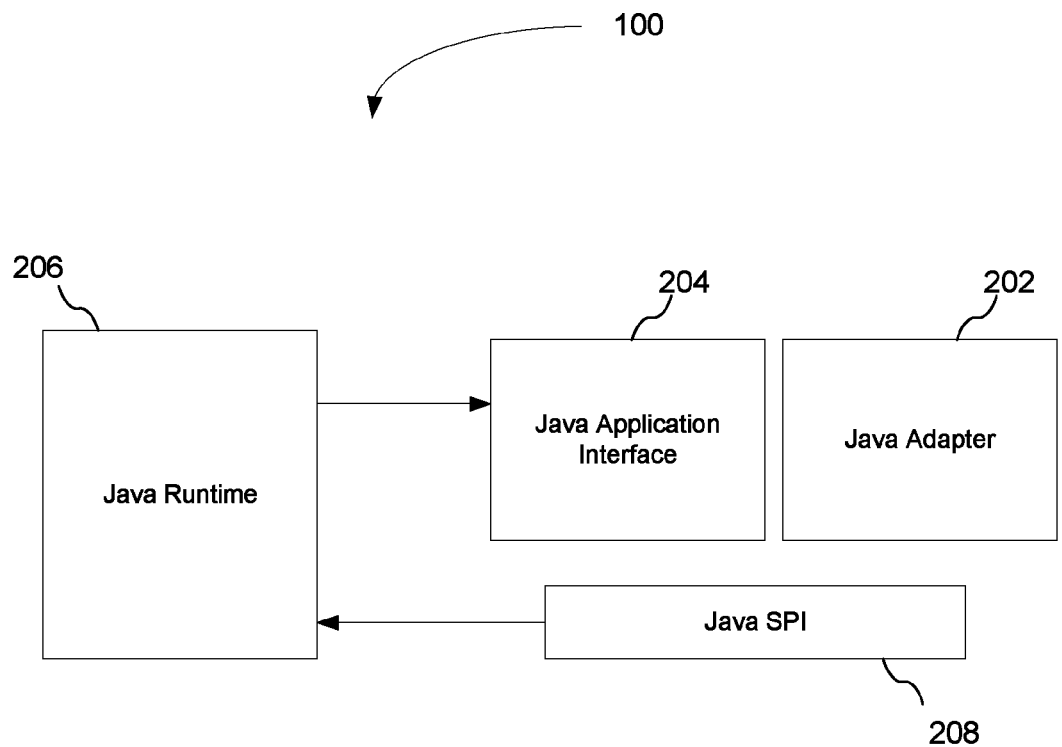

The choice of implementation language for adapters is determined by the client Application Programming Interface ("API") that the adapter uses to communicate with the external resource. FIG. 2 provides an example of the architecture component model 100 providing support for Java™ adapters 202. However, this illustration is intended only as an example as the architecture component model 100 can provide support for various languages. Accordingly, Java™ adapter 202 can be built. A Java™ runtime 206 interacts with the Java™ adapter 202 through a Java™ Application Interface. Further, the Java™ Service Provider Interface ("SPI") provides the set of interfaces to exchange data with the Java adapter 202.

The Java adapters 202 are implemented according to the JCA specification with some extensions. Accordingly, the JCA is extended to support several new capabilities. The JCA CCI does not define any data exchange interfaces. Interactions use the opaque Record interface, the implementation of which is entirely determined by the Java™ adapter 202. This lack of specificity makes it impossible to use a Java™ adapter 202 without first developing some custom code to create and interpret a Java™ adapter's 202 Record objects. The Java™ SPI 208 defines a standard data exchange interface that is utilized to efficiently transfer data between the Java™ adapter 202 and the Java™ Application Interface 204. Further, the Java™ adapter 202 may be utilized for multiple runtimes.

To support DESPI, e.g., the Java™ SPI 208, the JCA CCI is extended with connected records and streams as first class entities. The connected CCI Records maintain active connection to their data source and allow sequential retrieval of records. The connected Records should be supported in both non-managed or managed mode. The Records allow the invoker to close the connection. The connected record is not serializable or remotable. When an attempt is made to serialize the connected record, the provider must provide the serialization by performing a full data retrieval and store, and then issue a warning about suboptimal use of the record. If the serialization could cause unpredictable behavior because of the retrieved data size, the Record instead may throw an exception.

Figure 3:
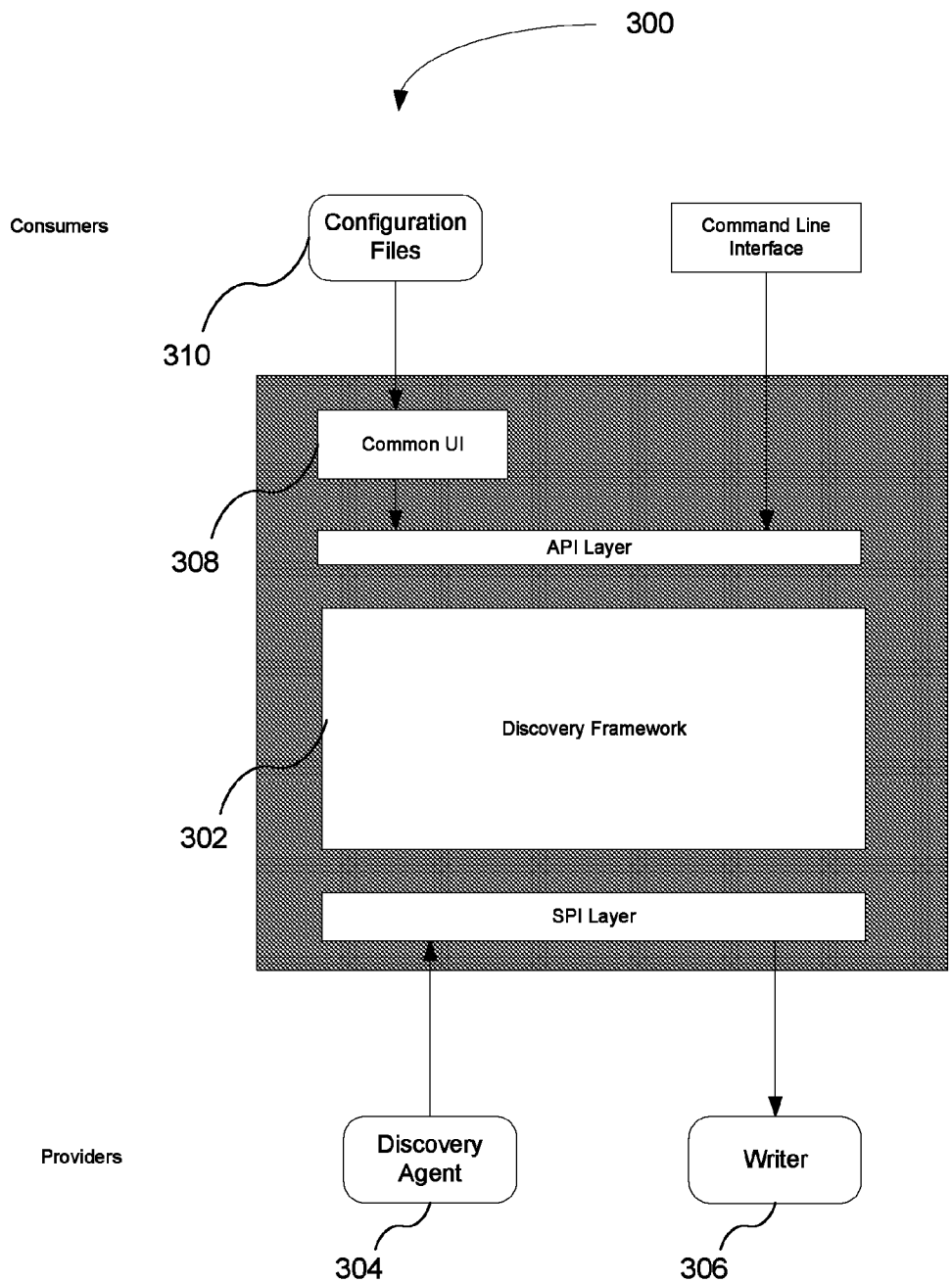
FIG. 3 illustrates a tooling configuration that may be utilized for service discovery and artifact creation in the architecture component model.

In many cases, the data accessible through the connector is available in the stream format. The DESPI, e.g., the Java™ SPI 208, exposes streams as first-class Records to allow passing of streams between the Java™ adapter 202 and the Java™ Runtime 206 for inbound and outbound connectivity FIG. 3 illustrates a tooling configuration 300 that may be utilized for service discovery and artifact creation in the architecture component model 100. The tooling configuration 300 includes a discovery framework 302, which defines one or more Discovery Agents 304 and one or more writers 306. The Discovery Service of an adapter 102 (as shown in FIG. 1) is wrapped as a Discovery Agent 304 by tooling. The Discovery Agent 304 for the adapter 102 enables the tooling to connect to an external resource and discover importable objects. The Discovery Agent 304 is isolated from a common User Interface ("UI") 308 in which the discovery framework 302 can be run from. In an alternative embodiment, the discovery framework 302 can be run without the UI 308. Further, pluggability is provided for the writers 306, which can be artifact writers, to store the metadata and configuration information in a manner compatible with the tooling and runtime needs. Configuration files 310 may be utilized to contain properties required runtime. Alternatively, the configuration information and metadata may be directly written to a native repository.

Record classes can be generated for performance benefits. The architecture component model 100 also permits the use of record implementations that provide metadata to be dynamically processed.

Figure 4:
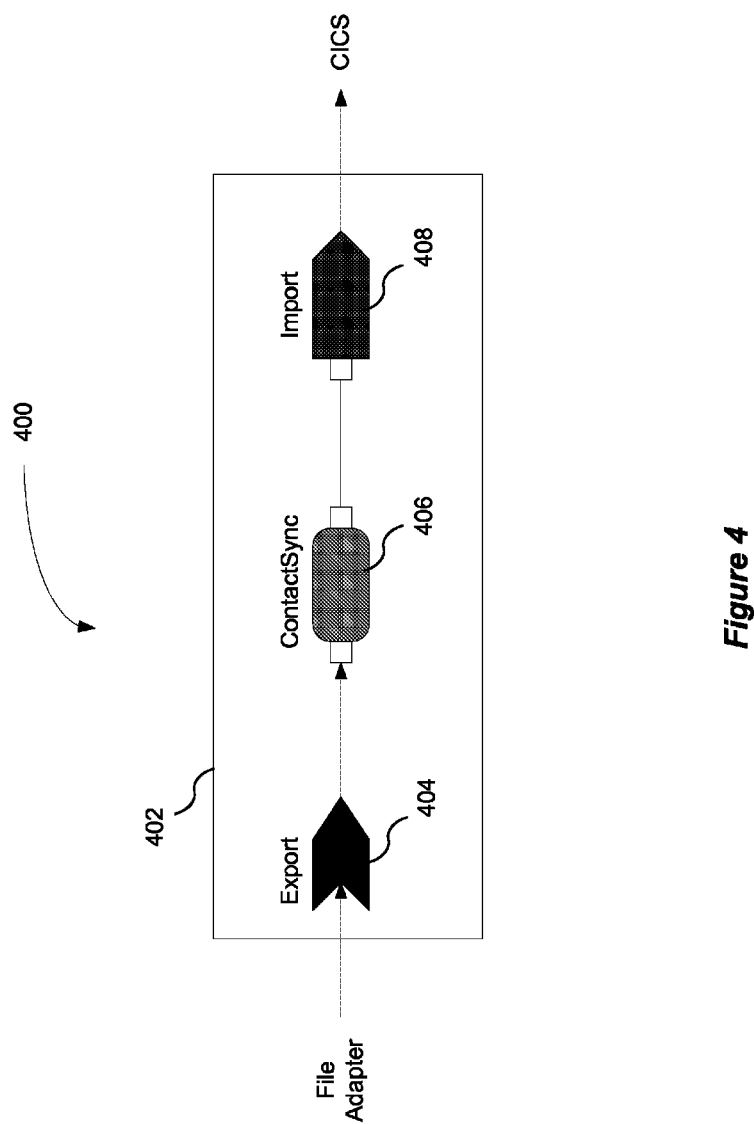
FIG. 4 illustrates a module that may be utilized in a programming model for the adapters in the architecture component model illustrated in FIG. 1.

FIG. 4 illustrates a module 400 that may be utilized in a programming model for the adapters 102 in the architecture component model 100 illustrated in FIG. 1. While the contract between the adapter 102 and the application interface component 108 is well defined (following the JCA 1.5 CCI interface for control flow together and the DESPI interface for data exchange), the contract between a runtime and the application interface component 108 is determined entirely by the implementation of the application interface component 108. The role of the application interface component 108 is to provide a mapping between the runtime's control and data interfaces to that of the adapter 102. The adapters 102 can be deployed in a number of different environments. For example, the adapters 102 can be deployed in a managed environment such as a managed J2EE™ container. The adapters 102 can also be deployed in a non-managed environment such as a non-managed container in either a Java™ or native environment. As there are many ways to package and deploy adapters, the selected method is determined by the needs of the runtime. In all cases, the deployment of adapters should be consistent with the other components of that runtime, so that the architecture of the adapters 102 is hidden and the adapters 102 appear to the runtime as do any other component.

As an example, the module 400 synchronizes contact information between a file adapter and Customer Information Control System ("CICS"). The ContactSync component 406 listens via an Export 404 for a notification of changes to contacts. The ContactSync component 406 then propagates changes to the CICS system utilizing an Import 408.

The Import 408 and the Export 404 bridge the gap between SCA components and external EIS systems available through J2C resource adapters. In other words, the Import 408 and the Export 404 form the Application Interface Component 108 that exposes EIS services to SCA clients.

The binding of invocations to EIS services is done at three levels: interface, method, and data. The interface binding describes the mapping between EIS Service connection information and the Service interface that represents this service. The method binding expresses the relationship between interface's operations information needed to perform interaction with the EIS service. Finally, the data binding defines how the Service input or output data is mapped to the EIS data format.

The Imports 408 and the Exports 404 are provided using the Service Component Definition Language ("SCDL") to describe the bindings, Web Service Definition Language ("WSDL") to describe interface of the service, and XSDs to describe the data exchanged with the service.

An example of SCDL code that may be utilized for the Import 408 is provided below:

```
...
<scdl:import xmlns:xsi="http://www.w3.org/2001/XMLSchema-instance"
    ...
displayName="PeopleSoftOutboundInterface"
name="PeopleSoftOutboundInterface">
    <interfaces>
        <interface xsi:type="wsdl:WSDLPortType"
portType="ns1:PeopleSoftOutboundInterface">
        </interface>
    </interfaces>
    <esbBinding xsi:type="eis:EISImportBinding"
        dataBindingType="com.ibm.j2ca.peoplesoft.PeopleSoftRecord">
        <resourceAdapter
            name="PeopleSoftTestOutboundApp.IBM WebSphere Adapter
for PeopleSoft Enterprise"
            type="com.ibm.j2ca.peoplesoft.PeopleSoftResourceAdapter">
            <properties/>
        </resourceAdapter>
        <connection
type="com.ibm.j2ca.peoplesoft.PeopleSoftManagedConnectionFactory"
interactionType="com.ibm.j2ca.peoplesoft.PeopleSoftInteractionSpec">
            <properties>
                <hostName>9.26.248.212</hostName>
            </properties>
            <authentication resAuthAlias="SCA_Auth_Alias"/>
        </connection>
        <methodBinding method="createWbiCustomerCi">
            <interaction>
                <properties>
                    <functionName>Create</functionName>
                </properties>
            </interaction>
        </methodBinding>
    </esbBinding>
</scdl:import>
}
```

The sample code is utilized for a client to invoke the Import 408. First, the client creates an instance of the ServiceManager and looks up the Import 408 using its reference name. The result of the lookup is a service interface implementation. Subsequently, the client creates, with the user of an interface implementation, an input argument dynamically using the data object schema. This input argument is a generic DataObject. Finally, the client invokes EIS and obtains the result.

An example of SCDL code that may be utilized for the Export 404 is provided below:

```
ServiceManager serviceManager = ServiceManager.INSTANCE;
...
Service request = (Service) serviceManager.locateService("PSOFT");
DataFactory dataFactory = DataFactory.INSTANCE;
DataObject input = dataFactory.create ("http://www.psoft.com",
    "PSOFT");
input.setString("LastName", "Verdi");
Object objectResult= request.invoke("createWbiCustomer", input);
DataObject result = (DataObject)objectResult;
String customerID = result.getString("CustomerID");
```

The sample code is utilized to provide access to the functionality of the services provided by the CICS. The client of the adapter 102 interacts with it using the service interface that is converted to the invocation of the adapter's CCI interfaces.

In general, the module 400 is a managed scenario. For example, the module 400 may be represented and packaged as a J2EE™ EAR file. The resource adapter 102 may be deployed either inside the EAR file, during EAR installation, or separately, at the node level, with its artifacts created during the application install for either of these cases. The non-managed mode is also supported.

Figure 5:
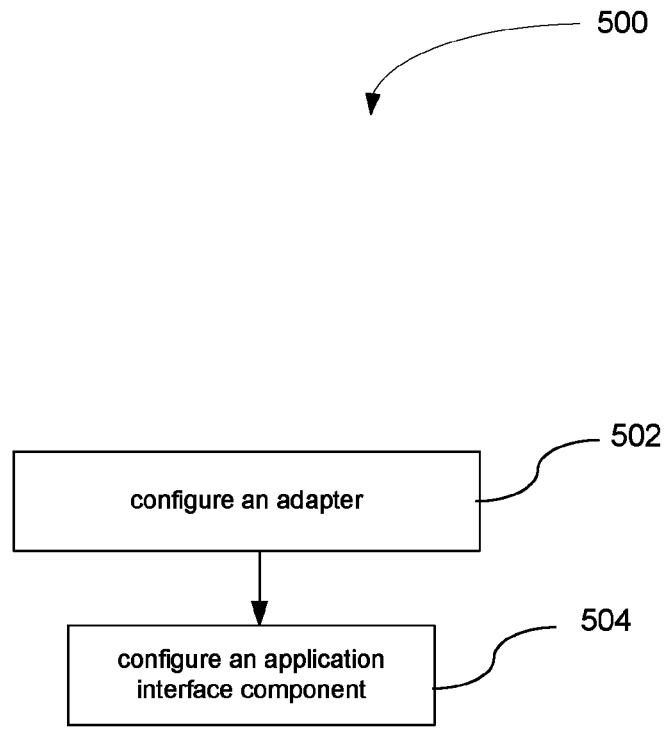
FIG. 5 illustrates a process that may be utilized to establish the architecture component model.

FIG. 5 illustrates a process 500 that may be utilized to establish the architecture component model 100. At a process block 502, the process 500 configures an adapter such that the adapter is specific to a data source, provides a communication link to the data source, converts a format of the data source to a format native to a middleware system, and converts a format of metadata of the data source to a standard metadata format. Further, at a process block 504, the process 500 configures an application interface component to convert an invocation of a function in the middleware system to an invocation of a function provided by an EIS through the adapter, convert the data format of the middleware system to a format native to the EIS accessed through the adapter, and maintain metadata describing a message format and a function provided by the adapter.

In yet another embodiment, a process is provided for the middleware system to utilize the architecture component model 100. The process configures an adapter to access a particular data source instance or the metadata repository corresponding to that specific data source instance. Further, the process requests, through the architecture component module 100, a list of functions and the corresponding message formats provided by a data source. In addition, the process utilizes the returned metadata to allow the selection of the subset of functions required for the given business application. The process also utilizes the returned metadata to build an abstract representation of the selected data source functions and messages. Further, the process serializes the abstract functions and messages utilizing the data formats and function of method invocation model of the middleware system. In addition, the process builds an application of the middleware system that utilizes the functions of the data source. The process also deploys the application that utilizes functions of the data source. Finally, the process utilizes the architecture component model 100 to send and receive data with the data source as directed by the application.

Figure 6:
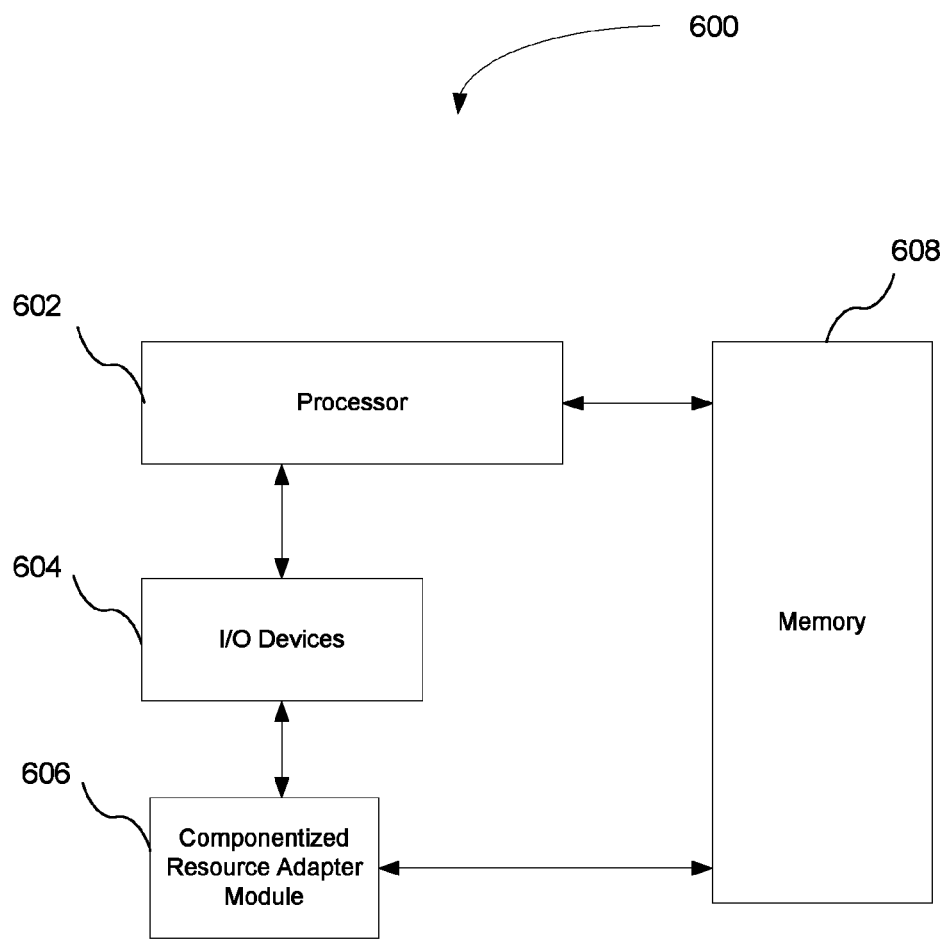
FIG. 6 illustrates a block diagram of a system that utilizes a componentized resource adapter architecture.

FIG. 6 illustrates a block diagram of a system 600 that utilizes a componentized resource adapter architecture. In one embodiment, the system 600 is suitable for storing and/or executing program code and is implemented using a general purpose computer or any other hardware equivalents. Thus, the system 600 comprises a processor 602, a memory 608, e.g., random access memory ("RAM") and/or read only memory ("ROM"), a componentized resource adapter module 606, and various input/output devices 604.

The processor 602 is coupled, either directly or indirectly, to the memory 608 through a system bus. The memory 608 can include local memory employed during actual execution of the program code, bulk storage, and/or cache memories which provide temporary storage of at least some program code in order to reduce the number of times code must be retrieved from bulk storage during execution.

The input/output devices 604 can be coupled directly to the system 600 or through intervening input/output controllers. Further, the input/output devices 604 can include a keyboard, a keypad, a mouse, a microphone for capturing speech commands, a pointing device, and other user input devices that will be recognized by one of ordinary skill in the art. Further, the input/output devices 604 can include a receiver, transmitter, speaker, display, image capture sensor, biometric sensor, etc. In addition, the input/output devices 604 can include storage devices such as a tape drive, floppy drive, hard disk drive, compact disk ("CD") drive, etc.

Network adapters may also be coupled to the system 600 to enable the system 600 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W"), and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A computer program product comprising a non-transitory computer readable storage device having a computer readable program stored thereon, wherein the computer readable program when executed on a computer causes the computer to:

configure an adapter such that the adapter is specific to a data source, provides a communication link to the data source, converts a format of the data source to a format native to a middleware system, and converts a format of metadata of the data source to a standard metadata format;

configure an application interface component to provide a mapping between control and data interfaces of the middleware system to control and data interfaces of the adapter, convert an invocation of a function in the middleware system to an invocation of a function provided by an Enterprise Information System through the adapter, convert the data format of the middleware system to a format native to the Enterprise Information System accessed through the adapter, maintain metadata describing a message format and a function provided by the adapter, and invoke the function provided by the Enterprise Information System.

2. The computer program product of claim 1, wherein the data source is a database management system.

3. The computer program product of claim 1, wherein the data source is a local file system.

4. The computer program product of claim 1, wherein the data source is a remote file system.

5. The computer program product of claim 1, wherein the data source is the Enterprise Information System.

6. The computer program product of claim 1, wherein the data source is a transaction system.

7. The computer program product of claim 1, wherein the data source is a mail system.

8. The computer program product of claim 1, wherein the adapter transfers security credentials to the data source.

9. The computer program product of claim 1, wherein the adapter manages transactions with the data source.

10. The computer program product of claim 1, wherein the computer readable program when executed on the computer further causes the computer to configure a monitoring interface for performance and event management.

11. The computer program product of claim 1, wherein the computer readable program when executed on the computer further causes the computer to configure a management interface to manage the activities of the adapter.

12. The computer program product of claim 1, wherein the middleware system is based on Service Component Architecture.

13. The computer program product of claim 1, wherein the middleware system is based on Java™ EE.

14. A method comprising:

configuring, with a processor, an adapter such that the adapter is specific to a data source, provides a communication link to the data source, converts, with the processor, a format of the data source to a format native to a middleware system, and converts, with the processor, a format of metadata of the data source to a standard metadata format; and configuring, with the processor, an application interface component to provide a mapping between control and data interfaces of the middleware system to control and data interfaces of the adapter, convert an invocation of a function in the middleware system to an invocation of a function provided by an Enterprise Information System through the adapter, convert, with the processor, the data format of the middleware system to a format native to the Enterprise Information System accessed through the adapter, maintain metadata describing a message format and a function provided by the adapter, and to invoke the function provided by the Enterprise Information System.

15. The method of claim 14, wherein the data source is a database management system.

16. The method of claim 14, wherein the data source is a local file system.

17. The method of claim 14, wherein the data source is a remote file system.

18. The method of claim 14, wherein the data source is the Enterprise Information System.

19. The method of claim 14, wherein the data source is a transaction system.

20. The method of claim 14, wherein the data source is a mail system.

21. A system comprising:
a processor;
an adapter that is specific to a data source, provides, with the processor, a communication link to the data source, converts, with the processor, a format of the data source to a format native to a middleware system, and converts, with the processor, a format of metadata of the data source to a standard metadata format; and
an application interface component that provides, with the processor, a mapping between control and data interfaces of the middleware system to control and data interfaces of the adapter, converts, with the processor, an invocation of a function in the middleware system to an invocation of a function provided by an Enterprise Information System through the adapter, converts, with the processor, the data format of the middleware system to a format native to the Enterprise Information System accessed through the adapter, maintains, with the processor, metadata describing a message format and a function provided by the adapter, and invokes, with the processor, the function provided by the Enterprise Information System.

22. The system of claim 21, wherein the data source is a database management system.

23. The system of claim 21, wherein the data source is a local file system.

24. The system of claim 21, wherein the data source is a remote file system.

25. The system of claim 21, wherein the data source is the Enterprise Information System.

* * * * *